(12) United States Patent
Chen et al.

(10) Patent No.: US 8,068,868 B2
(45) Date of Patent: Nov. 29, 2011

(54) UPLINK POWER ALIGNMENT ESTIMATION IN A COMMUNICATION SYSTEM

(75) Inventors: Jiangnan Jason Chen, Hawthorn Woods, IL (US); Jamil M. Shihab, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 218 days.

(21) Appl. No.: 12/647,570

(22) Filed: Dec. 28, 2009

(65) Prior Publication Data

US 2011/0159911 A1 Jun. 30, 2011

(51) Int. Cl.
 *H04B 1/00* (2006.01)
 *H04B 7/00* (2006.01)
 *H04Q 11/12* (2006.01)
(52) U.S. Cl. .............. 455/522; 455/69; 455/127.1
(58) Field of Classification Search .......... 455/522, 455/69, 127.1
See application file for complete search history.

(56) References Cited

U.S. PATENT DOCUMENTS

| 7,706,827 B2 * | 4/2010 | Catreux-Erceg et al. ..... 455/522 |
| 7,907,961 B2 * | 3/2011 | Catreux-Erceg et al. ..... 455/522 |
| 7,933,567 B2 * | 4/2011 | Guda et al. .................... 455/126 |
| 7,986,959 B2 * | 7/2011 | Malladi et al. ................ 455/522 |
| 2008/0207150 A1 * | 8/2008 | Malladi et al. ............ 455/127.1 |
| 2008/0280638 A1 * | 11/2008 | Malladi et al. ................ 455/522 |

* cited by examiner

*Primary Examiner* — Tilahun B Gesesse (57) ABSTRACT

A method and apparatus for uplink power alignment estimation in a communication system includes a step 600 of defining an upper threshold and a lower threshold for a transmit power correction (TPC) level. A next step 602 includes keeping a total of accumulated TPC commands. A next step 604 includes determining that a power correction is needed. A next step 608 includes generating a TPC command to be sent to a user equipment per the needed power correction. A next step 610 includes adjusting the total according to one of the following conditions: if the total is between the upper and lower thresholds then the total is changed per the needed power correction, if the total is at either of the thresholds and the needed power correction would not exceed either of the thresholds then the total is changed per the needed power correction, and if the total is at either of the thresholds and the needed power correction would exceed either of the thresholds then total is kept the same.

14 Claims, 6 Drawing Sheets

- PRIOR ART -

UPLINK POWER ALIGNMENT ESTIMATION IN A COMMUNICATION SYSTEM

FIELD OF THE INVENTION

The present invention relates generally to Frequency Division Multiple Access (FDMA) and Orthogonal Frequency Division Multiple Access (OFDMA) communication systems, and, in particular, to uplink power alignment estimation in FDMA and OFDMA communication systems.

BACKGROUND OF THE INVENTION

Single Carrier and Multi-Carrier Frequency Division Multiple Access (FDMA) communication systems, such as Interleaved FDMA, OFDMA, and Discrete Fourier Transform Spread OFDMA communication systems, have been proposed for use in Fourth Generation (4G) communication systems, such as Long Term Evolution (LTE) communication system, for transmission of data over an air interface. In Single Carrier and Multi-Carrier FDMA communication systems, a frequency bandwidth is split into multiple contiguous frequency sub-bands, or sub-carriers, that are transmitted simultaneously. A user may then be assigned one or more of the frequency sub-bands for an exchange of user information, thereby permitting multiple users to transmit simultaneously on the different sub-carriers. To maximize the spectral efficiency, frequencies can be reused between sectors of a cell. As a result, interference from other sectors/cells may occur in this system, and therefore it is important to control user equipment (UE) transmit power levels.

A traditional power control scheme allows an evolved Node B (eNB) of the cell to control the transmit power of UEs under its control by sending transmit power correction (TPC) commands in an uplink scheduling grant sent in a downlink L1/L2 control channel to correct for estimation and accuracy errors. The TPCs received by each UE can be accumulated (to determine the absolute power level relative to a reference level). TPCs are used so that the eNB receives the same power for each served UE. The TPC commands direct that UE to increase or decrease its transmit power to meet these power requirements so as to maintain a target interference level and/or an average system performance level.

However, there may be instances where a UE will not receive these TPC commands from the eNB. This is especially true for UEs at the edge of a cell or at bad coverage locations resulting in severely limited RF channel conditions, such as during deep-fade scenarios. Losing TPC bits in a channel due to RF conditions can lead to a power misalignment between the UE and the eNB. For example, an eNB could think that the UE is transmitting at a maximum transmitter power, but the UE could actually be transmitting at a lower power level, or vice versa. Without proper agreement between a UE and eNB, one or the other could end up transmitting at full power resulting in additional interference in the system.

One solution to the problem is to communicate absolute TPC bits instead of accumulated TPC bits. In this way, when the UE reconnects it will know exactly which absolute transmitter power to use. However, switching back and forth between using absolute or accumulated TPC bits requires layer 2 messages and will take additional time. Even so, such instructions may not reach to the UE due to the same poor channel conditions that made the UE lose the TPC bits in the first place.

Another solution to the problem is to use a separate over the air message (either broadcast or UE specific) to realign the power level. Again this requires additional messaging and time, and such messages may not reach to the eNB due to the same poor channel conditions.

Still another solution is for the eNB to stop TPC bit generation when an accumulation of TPC bits reaches a power level threshold. However, this solution then assume subsequent TPC bit generation corresponding to a 0 dB adjustment, which may be a completely incorrect assumption.

Therefore, a need exists for an uplink power alignment estimate technique to address the situation where TPC bits are lost, without the need to utilize additional messaging.

One of ordinary skill in the art will appreciate that elements in the figures are illustrated for simplicity and clarity and that common and well-understood elements that are useful or necessary in a commercially feasible embodiment are often not depicted in order to facilitate a less obstructed view of these various embodiments of the present invention.

DETAILED DESCRIPTION OF THE INVENTION

The present invention provides an uplink power alignment estimation technique to address the situation where TPC bits are lost, without the need to utilize additional messaging. In particular, in order to maintain parity between an accumulated power control delta of the eNB and UE during periods of lost communication, the eNB continues transmitting power control updates even when the accumulated value reaches a threshold (e.g. +/−15 dB). When acknowledged communication is restored, the eNB makes subsequent power control updates assuming the UE is at the accumulated value threshold—if reached.

Figure 1:
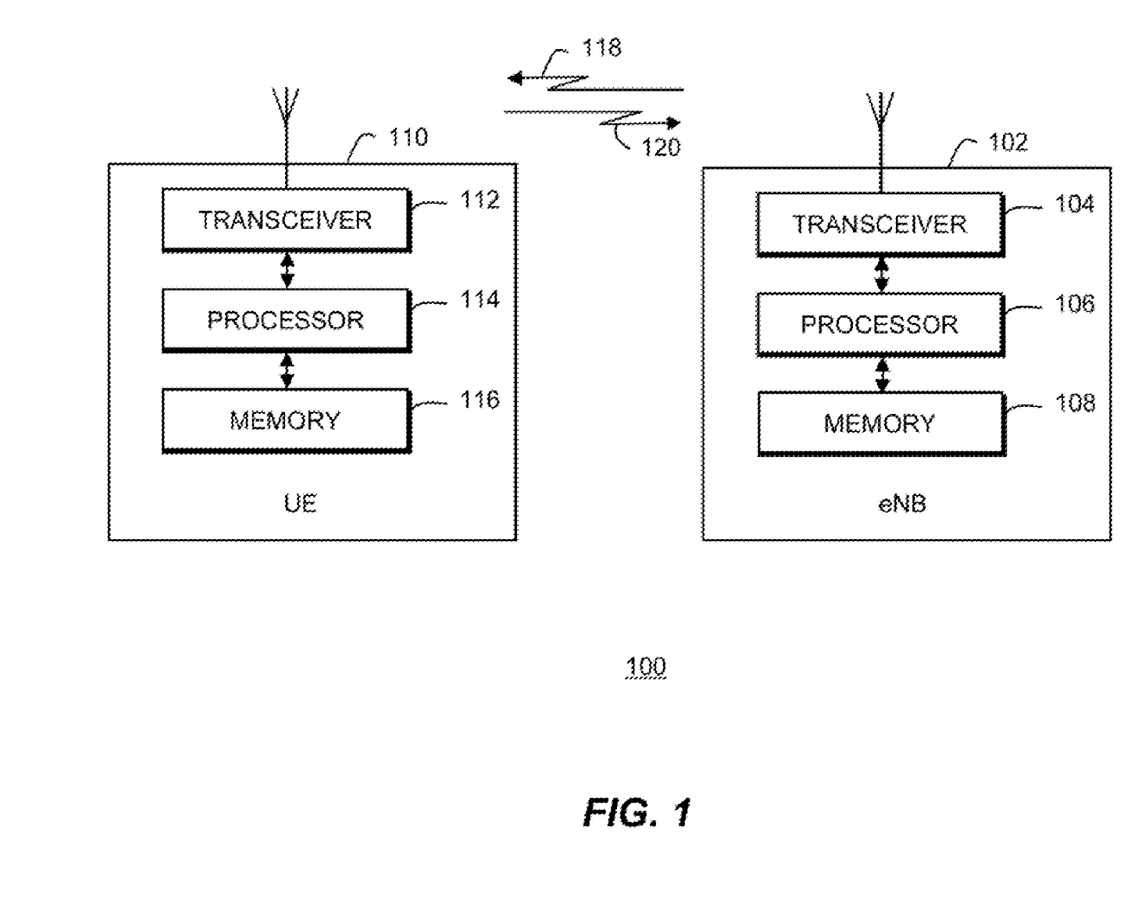
FIG. 1 is a block diagram of a wireless communication system in accordance with the present invention.

Referring to FIG. 1, a block diagram is shown of a wireless communication system 100 in accordance with the present invention. Communication system 100 includes an evolved NodeB (eNB) 102 that provides wireless communication services to a user equipment (UE) 110 residing in a coverage area, such as a cell or a sector, of the eNB via a respective air interface, such as an evolved UMTS Terrestrial Radio Access Network (E-UTRAN) air interface. The air interface comprises a respective downlink 118 and a respective uplink 120. Each of the downlinks and uplinks comprises multiple physical communication channels, including at least one signaling channel and at least one traffic channel. The eNB 102 includes a transceiver 104 coupled to a processor 106, such as one or more microprocessors, microcontrollers, digital signal processors (DSPs), combinations thereof or such other devices known to those having ordinary skill in the art. The particular operations/functions of the processor 106, and respectively thus of eNB 102, is determined by an execution of software instructions and routines that are stored in a respective at least one memory device 108 associated with the processor, such as random access memory (RAM), dynamic random access memory (DRAM), and/or read only memory (ROM) or equivalents thereof, that store data and programs that may be executed by the corresponding processor 106.

The UE 110 can comprise a cellular telephone, a radio telephone, a personal digital assistant (PDA) with radio frequency (RF) capabilities, or a wireless modem that provides RF access to digital terminal equipment (DTE) such as a laptop computer, and the like. For purposes of illustrating the principles of the present invention, it is assumed that the UE 110 is served by an E-UTRAN eNB 102. The UE 110 includes a transceiver 112 coupled to a processor 114, such as one or more microprocessors, microcontrollers, digital signal processors (DSPs), combinations thereof or such other devices known to those having ordinary skill in the art. The particular operations/functions of the processor 114, and respectively thus of UE 110, is determined by an execution of software instructions and routines that are stored in a respective at least one memory device 116 associated with the processor 114, such as random access memory (RAM), dynamic random access memory (DRAM), and/or read only memory (ROM) or equivalents thereof, that store data and programs that may be executed by the corresponding processor.

The embodiments of the present invention preferably are implemented within the eNB 102. More particularly, the functionality described herein is implemented with or in software programs and instructions stored in a memory and executed by an associated processor of the eNB 102. However, one of ordinary skill in the art realizes that the embodiments of the present invention alternatively may be implemented in hardware, for example, integrated circuits (ICs), application specific integrated circuits (ASICs), and the like, such as ASICs implemented in the eNB 102. Based on the present disclosure, one skilled in the art will be readily capable of producing and implementing such software and/or hardware without undue experimentation.

Communication system 100 comprises a wideband packet data communication system that employs a Single Carrier or a Multi-Carrier Frequency Division Multiple Access (FDMA) or Orthogonal Frequency Division Multiple Access (OFDMA) air interface technology, wherein a frequency bandwidth is split into multiple frequency sub-bands, or sub-carriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 preferably operates in accordance with the 3GPP (Third Generation Partnership Project) E-UTRAN (Evolved UMTS Terrestrial Radio Access Network) standards, which standards specify wireless telecommunications system operating protocols, including radio system parameters and call processing procedures. However, those who are of ordinary skill in the art realize that communication system 100 may operate in accordance with any wireless telecommunication system employing a frequency division multiplexing scheme or a time and frequency division multiplexing scheme, wherein a sub-band comprises a frequency sub-band or a time and frequency sub-band, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple proposed ultrawideband (UWB) communication systems.

Figure 2:
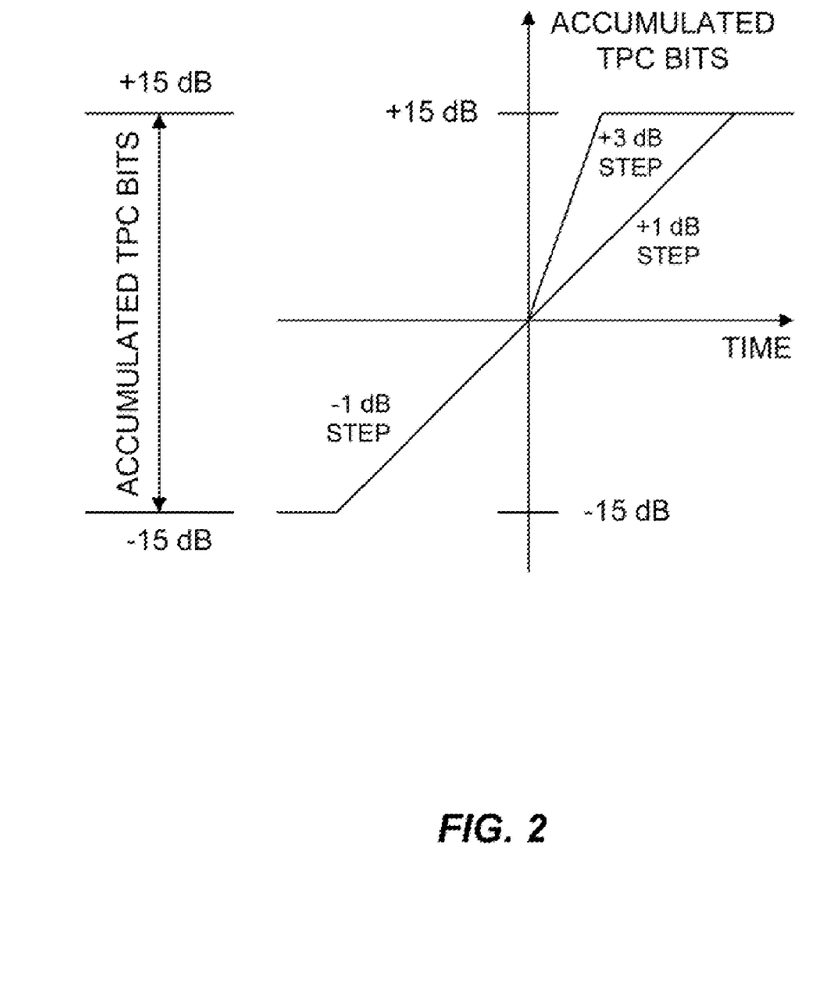
FIG. 2 is a graphical representation of transmit power control limitations.

Referring to FIG. 2, an E-UTRAN system defines transmit power level thresholds set its devices in order to control interference that these devices may cause, along with other power related considerations. In the E-UTRAN system for example, a UE transmitter is typically limited to a relative range of +/−15 dB, or 30 dB total. During operation, a UE receives a transmit power correction (TPC) bits in a TPC update control signal from a serving eNB that directs the UE to incrementally increase or decrease its transmit power level. In this example this incremental change could be a 1 dB step. In practice for the E-UTRAN system, the TPC bits direct the UE to change its transmit power by +1 dB, −1 dB, 0 dB, or optionally +3 dB for larger power adjustments. Other increments could also be configured depending on the communication system. The UE accumulates these TPC bits to keep track of its absolute transmit power level. If the UE accumulates enough received TPC bits such that its transmitter would exceed a power level threshold, then the UE limits its transmit power to that power level threshold (e.g. +/−15 dB).

Figure 3:
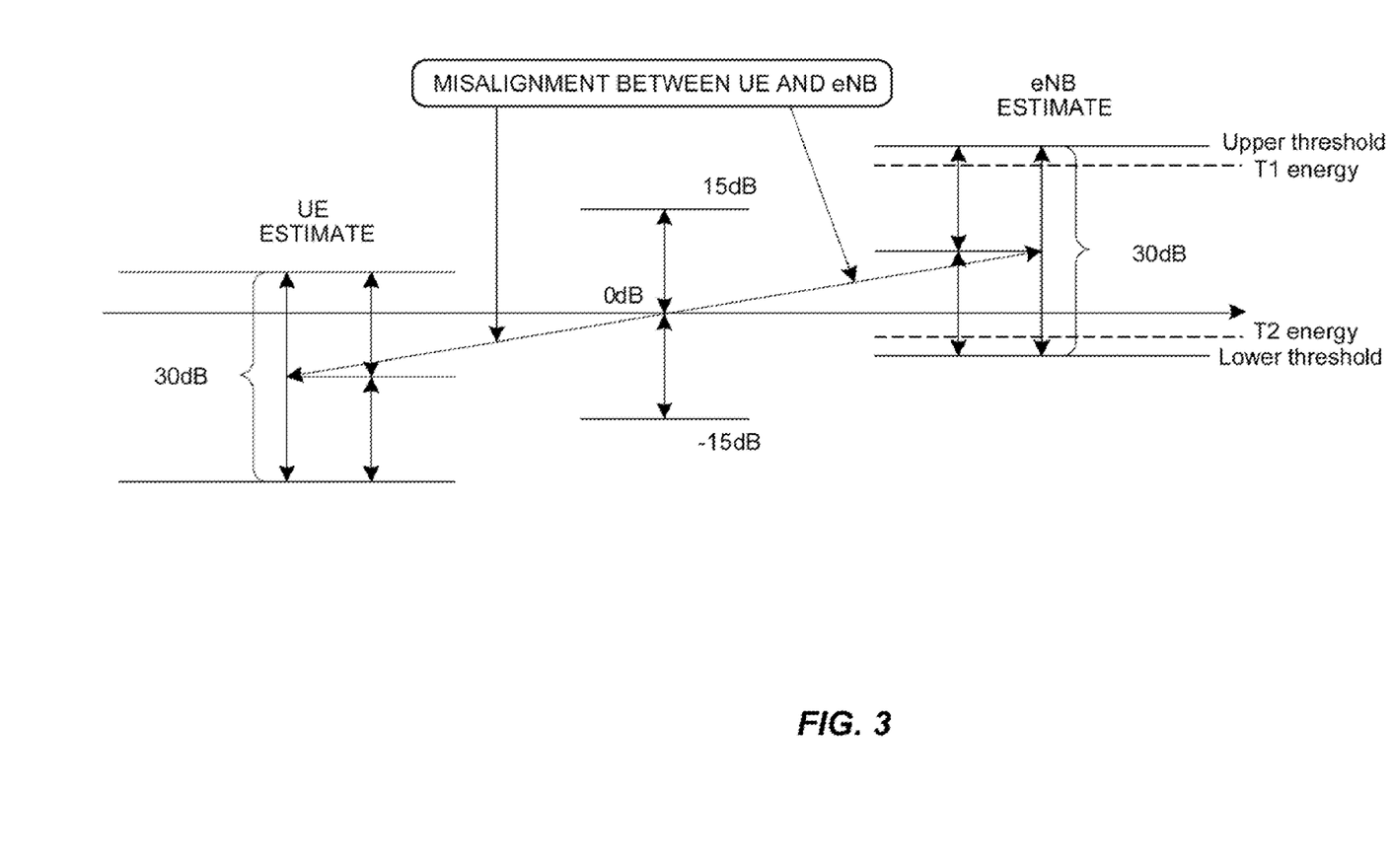
FIG. 3 is a graphical representation illustrating a transmit power misalignment that can occur when a UE loses contact with a eNB.

However, referring to FIG. 3, a problem can occur when a UE experiences a communication problem and does not receive or properly decode the TPC bits sent by the eNB. In this case, the eNB will think the UE is changing its transmit power level, but in actuality the UE is not, which causes a misalignment of the power levels estimated by the eNB and UE. When proper communications are re-established, the power levels remain misaligned until the UE sends an indication of its actual transmit power level to the eNB in order to synchronize the power control state at the UE and eNB. Such indication can include a pathloss estimate, CQI report, power headroom report, or a report of transmit power level and/or the expected received power level to the eNB for scheduling and resource allocation. In addition, a full report can be made for initial access or after a handover. However, in poor communication conditions this indication may still not be received by the eNB and thereby may not alleviate the misalignment. In the example shown, an eNB has been sending "power up" TPC bits to a UE that has not been properly receiving these TPC bits. As a result, the UE is operating at a lower power level than the eNB estimates. Of course the opposite (not shown) may also be true wherein the eNB has been sending "power down" TPC bits to a UE that has not been properly receiving these TPC bits. As a result, the UE will be operating at a higher power level than the eNB estimates.

Figure 4:
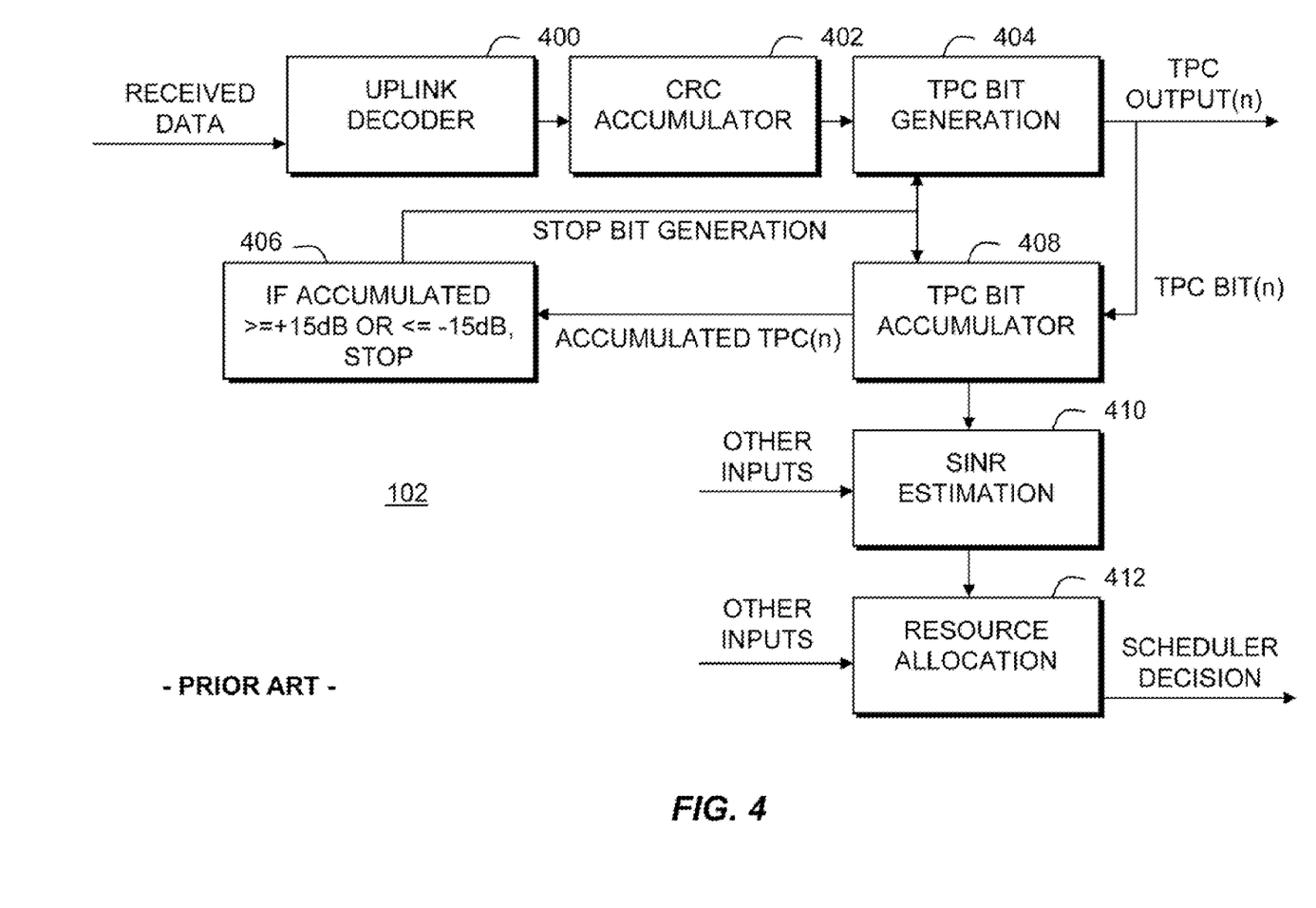
FIG. 4 is a block diagram of a prior art control technique for FIG. 1.

Referring to FIG. 4, an existing technique for eNB power control is shown. In this example, an eNB 102 receives data from a UE and decodes this data in an uplink decoder 400, as is known in the art. A Cyclic Redundancy Check (CRC) is performed on the data to determine if there are reception errors of the decoded data, i.e. Acknowledge/Not Acknowledged (ACK/NACK) states. The CRC accumulator 402 keeps track of the accumulated ACK/NACKs in a predetermined time period, CRCaccumulated. For example, if there are an excessive number of NACKs, i.e. CRCaccumulated exceed a CRC threshold, Tcrc, that is determined empirically for an acceptable amount of errors, this would be an indication for the eNB to direct the UE to increase its transmit power so that the eNB has better reception. This is done by TPC bit generation 404 in a TPC update, which sends TPC bits (i.e. TPC OUTPUT(n)) to the UE. A TPC bit accumulator 408 keeps track of the n TPC OUTPUT updates that are sent to the UE to keep an estimate a transmit power level of the UE. Under normal conditions the UE will maintain the same relative power level as the eNB. However, if the UE does not receive the TPC bits, then the relative powers levels of the UE and eNB may become misaligned (see FIG. 3).

For example, in the case where the eNB directs the UE to increase its transmit power, and the UE does not receive this instruction, the eNB will not perceive any improvement in its reception from the UE. Subsequently, the eNB will direct the UE to increase its power level again, and so on, until the accumulated TPC bits (ACCUMULATED TPC(n)) in the TPC bit accumulator 408 reaches a maximum power threshold (e.g. +15 dB). At this point the eNB presumes that the UE is at its maximum transmit power (e.g. >=+15 dB), any further increase of which will result in interference, and a threshold detector 406 will direct the TPC bit generator 404 to stop sending TPC change commands to the UE, i.e. the TPC bits will direct 0 dB changes. In this scenario, when proper communications have been reestablished with the UE, the misalignment of relative power levels will be maintained until absolute levels can be reestablished, which could take some time. The above describe existing technique is summarized in Table 1.

TABLE 1

Existing power level controls

IF lower threshold ≦ accumulatedTPC(n−1) ≦ upper threshold THEN
  accumulatedTPC(n) = accumulatedTPC(n−1) + TPCbit(n)
ELSE
  accumulatedTPC(n)= accumulatedTPC(n−1)
END IF
IF lower threshold ≦ accumulatedTPC(n) ≦ upper threshold THEN
  TPCoutput(n) = TPCbit(n)
ELSE
  TPCoutput(n) = 0 dB
END IF A Signal-to-Interference plus Noise Ratio (SINR) estimator 410 uses the estimated power level from the TPC bit accumulator, along with other system inputs, to estimate SINR. This estimate will be in error if the UE has not been receiving TPC bits properly. As the eNB allocates resource blocks and assigns modulation coding schemes depending on power levels, a resource allocation 412, will improperly allocate resources if the estimated power level of the UE is incorrect. The above existing technique does not alleviate these problems.

Figure 5:
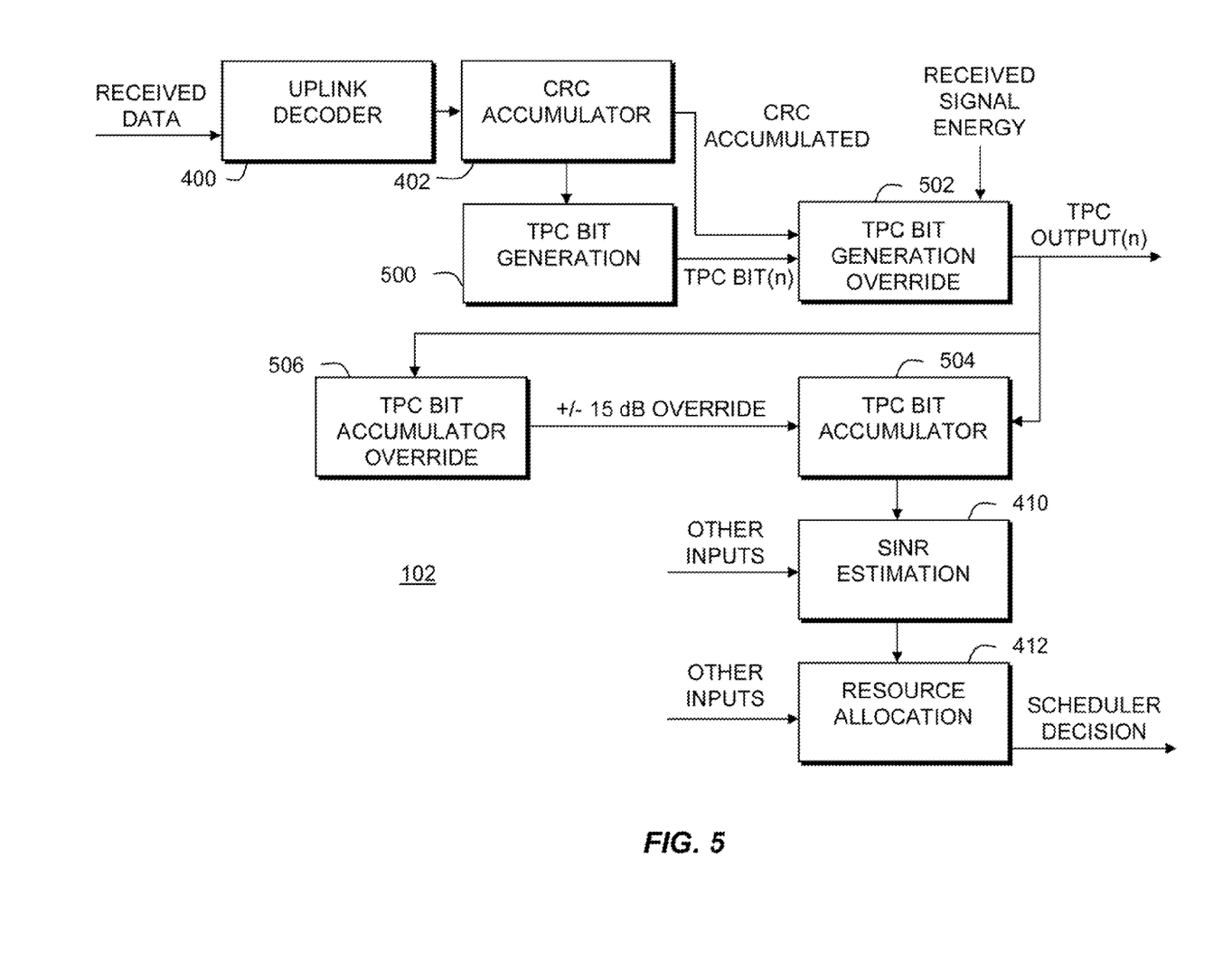
FIG. 5 is a block diagram of a alignment estimation technique for FIG. 1, in accordance with the present invention.

FIG. 5 illustrates a technique to alleviate the above problems in the eNB, in accordance with the present invention. In the present invention, the uplink decoder 400 and CRC accumulator 402 behave as before. If the CRC accumulator indicates that a power change is necessary, the TPC bit generation 500 will generate a TPC update, which sends TPC bits (i.e. TPC bit(n)) to a TPC bit generation override controller 502. The TPC bit generation override controller also receives inputs for received signal energy from the same data received from the UE and for CRCaccumulated. If CRCaccumulated from the CRC accumulator 402 exceeds a CRC threshold, Tcrc, and if the received signal energy is close to guard band thresholds (see T1energy and T2energy of FIG. 3), and if the TPC bits will push the power level over either the T1energy or T2energy threshold, then the TPC bit generation override controller will overwrite the TPC bits with TPCoutput(n)=0 dB. However, if the TPCoutput(n) would remain within the guard band thresholds between the power level thresholds, then the TPC bit generation override controller will pass TPCoutput(n)=TPC bit(n).

TPCoutput(n) is then provided to a TPC bit accumulator override controller 506 and the TPC bit accumulator 504, which keeps track of the n TPC OUTPUT updates that are sent to the UE to keep an estimate a transmit power level of the UE. In this embodiment, the TPC bit accumulator override controller 506 will direct the TPC bit accumulator 504 how to accumulate TPC bits depending on TPC OUTPUT(n). For example, if the accumulated TPC bits are within the power level thresholds, the TPC bit accumulator override controller 506 will direct the TPC bit accumulator 504 to add the next TPCbit(n) to the existing accumulated bits. If the accumulated TPC bits are at a power level threshold and the addition of TPCbit(n) would not exceed this threshold, then the TPC bit accumulator override controller 506 will direct the TPC bit accumulator 504 to add the next TPCbit(n) to the existing accumulated bits. If the accumulated TPC bits are at a power level threshold and the addition of TPCbit(n) would exceed this threshold, and there is an indication of any uplink shared channel transmission being received from the UE, then the TPC bit accumulator override controller 506 will direct the TPC bit accumulator 504 to keep the existing accumulated bits at the same amount, while at the same time TPC OUTPUT(n) will still continue to issue the up/down command per the TPC bit generation 500.

One advantage of this solution is that even though the TPC power control up/down commands may continue being sent to the UE in poor RF conditions, the total allocation due to power control is kept with the 30 dB dynamic range. In addition, when a UE recovers from a deep-fade situation, estimating the accumulated total power control update within this range provides a valid approximation of the UE transmit power that is sufficiently accurate until the next power headroom signaling update from the UE.

The above described novel techniques are summarized in Table 2.

TABLE 2

New power alignment estimation

IF lower threshold < accumulatedTPC(n−1) < upper threshold THEN
  accumulatedTPC(n) = accumulatedTPC(n−1) + TPCbit(n)
END IF
IF accumulatedTPC(n−1)=either threshold AND
sgn(TPCbit(n))≠sgn(TPCbit(n−1))
THEN
  accumulatedTPC(n) = accumulatedTPC(n−1) + TPCbit(n)
END IF
IF accumulatedTPC(n−1)=either threshold AND
sgn(TPCbit(n))=sgn(TPCbit(n−1))
THEN
  accumulatedTPC(n) = accumulatedTPC(n−1)
END IF
IF CRCaccumulated > Tcrc THEN
  IF received signal energy > T1energy AND TPCbit(n) > 0dB THEN
    TPCoutput(n) = 0 dB
  ELSE IF received signal energy < T2energy AND TPCbit(n) < 0dB
  THEN
    TPCoutput(n) = 0 dB
  ELSE
    TPCoutput(n) = TPCbit(n)
  END IF
ELSE
  TPCoutput(n) = TPCbit(n)
END IF where 'sgn' corresponds to a sign function, that is, when the quantity x is less than zero, then the sign of x is negative, and when the quantity x is greater than zero, then the sign of x is positive.

Figure 6:
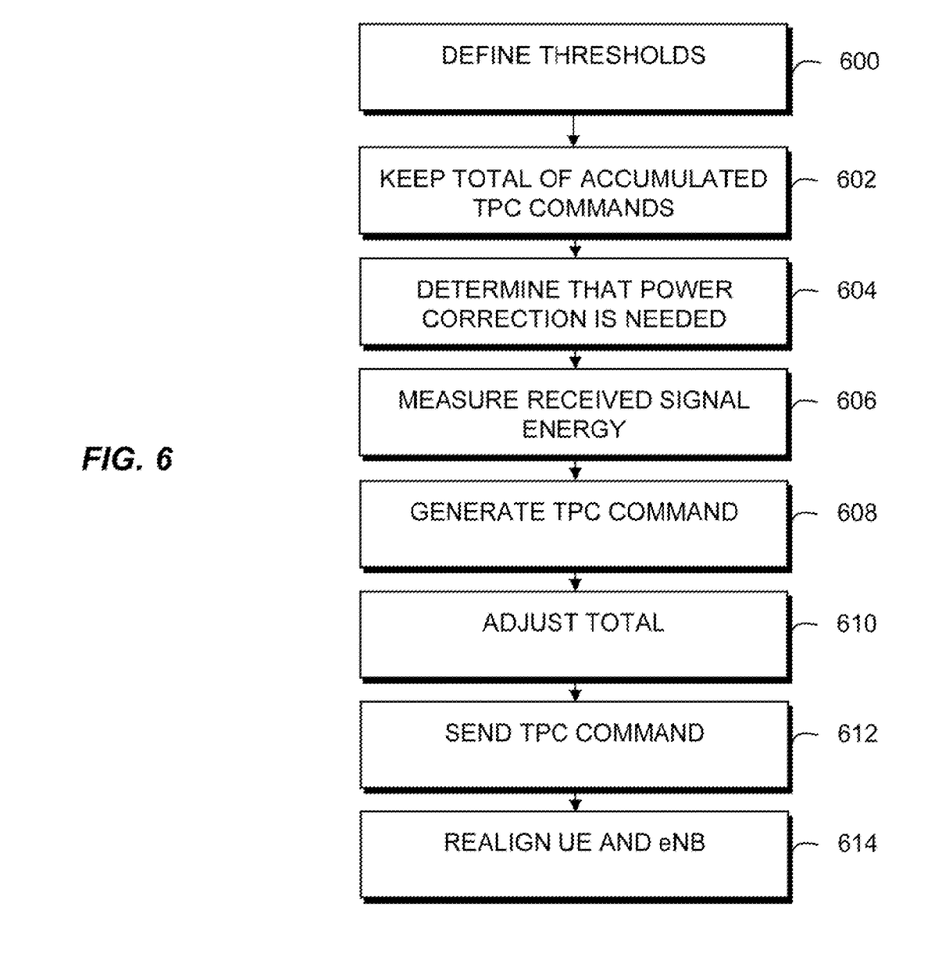
FIG. 6 illustrates a method in accordance with the present invention.

Referring to FIG. 6, the present invention also defines a method for uplink power alignment estimation by an evolved Node B (eNB) in a communication system, which includes a first step 600 of defining an upper threshold and a lower threshold for a transmit power correction (TPC) level. Optionally, this step includes defining a second upper threshold and second lower threshold for received signal energy from a user equipment (UE). These thresholds are stored in the eNB memory.

A next step 602 includes keeping a total of accumulated TPC commands to the UE in the eNB memory.

A next step 604 includes determining that a power correction is needed, i.e. CRCaccumulated is greater than Tcrc, where CRCaccumulated is a number of accumulated errors received from the UE over a predetermined time period and Tcrc is a threshold for a number of acceptable errors received from the UE.

A next step 606 includes the eNB transceiver measuring a received signal energy from the UE.

A next step 608 includes generating a TPC command to be sent to the UE per the needed power correction. Optionally this step includes setting the TPC command to zero if the received signal energy falls outside of the second upper threshold and second lower threshold and the TPC command will not bring the received signal energy within the second upper threshold or second lower threshold.

A next step 610 includes adjusting the total according to one of the following conditions:

a) if the total is between the upper and lower thresholds then the total is changed per the needed power correction, by adding the TPC bits of the TPC command.

b) if the total is at either of the thresholds and the needed power correction would not exceed either of the thresholds then the total is changed per the needed power correction, by adding the TPC bits of the TPC command. In other words, this condition is satisfied if the total is at the upper threshold and adding the TPC would not go over the upper threshold, or if the total is at the lower threshold and adding the TPC would not go under the lower threshold. Alternatively, this condition is satisfied if the total is at the upper threshold and the sign of the TPC is not the same as the sign of a last TPC, or if the total is at the lower threshold and the sign of the TPC is not the same as the sign of the last TPC.

c) if the total is at either of the thresholds and the needed power correction would exceed either of the thresholds then total is kept the same. In other words, this condition is satisfied if the total is at the upper threshold and adding the TPC would go over the upper threshold, or if the total is at the lower threshold and adding the TPC would go under the lower threshold. Alternatively, this condition is satisfied if the total is at the upper threshold and the sign of the TPC is the same as the sign of the last TPC, or if the total is at the lower threshold and the sign of the TPC is the same as the sign of the last TPC.

A next step 612 includes sending the TPC command to the UE.

A next step 614 includes realigning the power control state at the UE and eNB in response to a power headroom report or other indication of UE transmit power.

Advantageously, the present invention can realign the UE transmit power estimation on the eNB without any additional messages on either layer 2 or layer 3. The realignment is done without the need to switch back and forth between an absolute and accumulative mode of power estimation. The present invention provides a mechanism for effective power alignment estimate updates after a UE recovers from severely affected RF channel conditions. As a result, the present invention can drastically improve the call origination process and enhance eNB call setup performance on average by more than 70% reducing the call-blocking rate of the eNB, whereas previous call setup failure rates were about 90% at far locations, 50% at mid location and 30% at near locations. The present invention also increases user uplink throughput, in fading scenarios, since power alignment estimation at the eNB can be more accurate, and can enhance the call stability during the call period dramatically. The present invention can also increase the sector capacity by reducing unnecessary power estimate alignment messages during a call by providing additional available RF resources in the subframe for data traffic.

The description herein focuses on embodiments of the invention applicable to 4 G communication systems such as LTE. For example, the present invention can be implemented for LTE evolved NodeBs (eNB). However, the present invention could also be applied to the WiMAX base stations. Further, it will be appreciated that the invention is not limited to these applications but may be applied to many other cellular communication systems such as a 3GPP (Third Generation Partnership Project) E-UTRA (Evolutionary UMTS Terrestrial Radio Access) standard, a 3GPP2 (Third Generation Partnership Project 2) Evolution communication system, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple other proposed ultrawideband (UWB) communication systems.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors, and/or ASICS. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for uplink power alignment estimation by an evolved Node B (eNB) in a communication system, the method comprising the steps of:
   defining an upper threshold and a lower threshold for a transmit power correction (TPC) level;
   keeping a total of accumulated TPC commands sent to a user equipment (UE);
   determining that a power correction is needed;
   generating a TPC command to be sent to the UE per the needed power correction;
   adjusting the total according to one of the following conditions:
      if the total is between the upper and lower thresholds then the total is changed per the needed power correction,
      if the total is at either of the thresholds and the needed power correction would not exceed either of the thresholds then the total is changed per the needed power correction, and
      if the total is at either of the thresholds and the needed power correction would exceed either of the thresholds then total is kept the same;
   sending the TPC command to the UE.

2. The method of claim 1, further comprising the step of measuring a received signal energy from a user equipment.

3. The method of claim 2, wherein the defining step includes defining a second upper threshold and second lower threshold for the received signal energy.

4. The method of claim 3, wherein the generating step includes setting the TPC command to zero if the received signal energy falls outside of the second upper threshold and second lower threshold and the TPC command will not bring the received signal energy within the second upper threshold or second lower threshold.

5. The method of claim 4, wherein the generating step includes setting the TPC command to 0 dB if the received signal energy exceeds the second upper threshold and TPC command calls for an incremental power correction.

6. The method of claim 4, wherein the generating step includes setting the TPC command to 0 dB if the received signal energy falls below the second lower threshold and TPC command calls for a decremental power correction.

7. The method of claim 1, wherein the adjusting step includes adjusting the total according to one of the following conditions:
   if the total is between the upper and lower thresholds then the total is changed by adding the TPC,
   if the total is at the upper threshold and adding the TPC would not go over the upper threshold then the total is changed by adding the TPC,
   if the total is at the lower threshold and adding the TPC would not go under the lower threshold then the total is changed by adding the TPC,
   if the total is at the upper threshold and adding the TPC would go over the upper threshold then the total is not changed, and
   if the total is at the lower threshold and adding the TPC would go under the lower threshold then the total is not changed.

8. The method of claim 1, wherein the adjusting step includes adjusting the total according to one of the following conditions:
   if the total is between the upper and lower thresholds then the total is changed by adding the TPC,
   if the total is at the upper threshold and the sign of the TPC is not the same as the sign of a last TPC then the total is changed by adding the TPC,
   if the total is at the lower threshold and the sign of the TPC is not the same as the sign of the last TPC then the total is changed by adding the TPC,
   if the total is at the upper threshold and the sign of the TPC is the same as the sign of the last TPC then the total is not changed, and
   if the total is at the lower threshold and the sign of the TPC is the same as the sign of the last TPC then the total is not changed.

9. The method of claim 1, wherein the determining step includes determining that CRCaccumulated is greater than Tcrc, where CRCaccumulated is a number of accumulated errors received from the UE over a predetermined time period and Tcrc is a threshold for a number of acceptable errors received from the UE.

10. The method of claim 1, further comprising the step of realigning the power control state at the UE and eNB in response to a power headroom report.

11. An evolved NodeB (eNB) for providing uplink power alignment estimation in a communication system, the eNB comprising:
    a memory operable to hold a defined upper threshold and a lower threshold for a transmit power correction (TPC) level, and to keep a total of accumulated TPC commands sent to a user equipment (UE);
    a processor coupled to the memory, the processor operable to determining that a power correction is needed, generate a TPC command to be sent to the UE per the needed power correction, and adjust the total according to one of the following conditions: if the total is between the upper and lower thresholds then the total is changed per the needed power correction, if the total is at either of the thresholds and the needed power correction would not exceed either of the thresholds then the total is changed per the needed power correction, and if the total is at either of the thresholds and the needed power correction would exceed either of the thresholds then total is kept the same; and
    a transceiver coupled to the processor and operable to send the TPC command to the UE.

12. The eNB of claim 11, wherein the transceiver is further operable to measure a received signal energy from a user equipment.

13. The eNB of claim 12, wherein the memory is further operable to store a defined second upper threshold and a second lower threshold for the received signal energy.

14. The eNB of claim 13, wherein the processor is further operable to set the TPC command to zero if the received signal energy falls outside of the second upper threshold and second lower threshold and the TPC command will not bring the received signal energy within the second upper threshold or second lower threshold.

* * * * *